United States Patent
Furutani

(10) Patent No.: US 8,369,318 B2
(45) Date of Patent: Feb. 5, 2013

(54) NETWORKING APPARATUS AND TELEPHONY SYSTEM

(75) Inventor: Senichi Furutani, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 9 days.

(21) Appl. No.: 13/099,703

(22) Filed: May 3, 2011

(65) Prior Publication Data

US 2011/0274103 A1 Nov. 10, 2011

(30) Foreign Application Priority Data

May 6, 2010 (JP) .................. 2010-106233

(51) Int. Cl.
*H04L 12/66* (2006.01)

(52) U.S. Cl. ..... 370/352; 370/466; 370/493; 379/88.21; 379/245

(58) Field of Classification Search .................. None
See application file for complete search history.

(56) References Cited

U.S. PATENT DOCUMENTS

| | | | | |
|---|---|---|---|---|
| 4,959,856 A | * | 9/1990 | Bischoff et al. | 379/245 |
| 7,075,918 B1 | * | 7/2006 | Kung et al. | 370/352 |
| 7,356,136 B2 | * | 4/2008 | Eshun et al. | 379/201.12 |
| 7,480,260 B1 | * | 1/2009 | Vashisht et al. | 370/271 |
| 2006/0187904 A1 | | 8/2006 | Oouchi | |
| 2008/0193543 A1 | | 8/2008 | Morello, III et al. | |
| 2009/0296918 A1 | | 12/2009 | Becker | |

FOREIGN PATENT DOCUMENTS

| | | |
|---|---|---|
| JP | 2006222666 A | 8/2006 |
| JP | 2006229820 A | 8/2006 |
| WO | 01/37585 A2 | 5/2001 |

OTHER PUBLICATIONS

Extended European Search Report from a corresponding European application dated Sep. 14, 2011.

\* cited by examiner

*Primary Examiner* — Jeffrey M Rutkowski
(74) *Attorney, Agent, or Firm* — Morgan, Lewis & Bockius LLP

(57) ABSTRACT

A networking apparatus including a PBX that relays between and manages IP and analog telephones that are assigned extension number information has: a VoIP conversion portion which converts an analog audio signal into an IP signal; an IP connection portion to which an IP telephone is connected; and an analog connection portion to which an analog telephone is connected. When a call originated from an IP or analog telephone is relayed and connected to an analog telephone, extension number information of the call originator is output to the analog telephone.

2 Claims, 4 Drawing Sheets

FIG.4

| | PORT | EXTENSION NUMBER | GROUP | TIME-OUT OPERATION |
|---|---|---|---|---|
| ANALOG TELEPHONES | 1 | 301 | 20 | TRANSFER |
| | 2 | 302 | 20 | VOICE MAIL |
| IP TELEPHONES | 1 | 401 | 30 | TRANSFER |
| | 2 | 402 | 30 | TRANSFER |
| | 3 | 403 | 30 | VOICE MAIL |
| | 4 | 404 | 30 | VOICE MAIL |

NETWORKING APPARATUS AND TELEPHONY SYSTEM

This application is based on Japanese Patent Application No. 2010-106233 filed on May 6, 2010, the contents of which are hereby incorporated by reference.

BACKGROUND OF THE INVENTION

1. Field of the Invention

The present invention relates to a networking apparatus and a telephony system.

2. Description of Related Art

As disclosed in JP-A-2006-229820 (Patent Document 1), there are known devices called VoIP gateways which permit PBXs (Private Branch Exchanges) and telephones to be connected to a VoIP (Voice over Internet Protocol) network to enable them to receive IP telephony services.

On the other hand, as disclosed in JP-A-2006-222666 (Patent Document 2), it is known that VoIP telephony is designed to offer functions similar to those offered by analog telephony and is in addition capable of being implemented with, by use of SIP (Session Initiation Protocol) functions, various value-added functions that are unfeasible in a system using analog telephones.

Inconveniently, however, according to Patent Documents 1 and 2 mentioned above, a system employing a VoIP gateway employs IP telephones only, and does not employ traditional analogue telephones. That is, analogue telephones are not furnished with VoIP functions, and accordingly VoIP gateways are not provided with ports for connection with analog telephones. Thus, disadvantageously, VoIP gateways do not allow use of analog telephones.

Nor are analog telephones furnished with SIP functions, and accordingly, disadvantageously, they cannot utilize the caller number display service which is relayed via a VoIP gateway.

SUMMARY OF THE INVENTION

The present invention has been made to overcome the inconveniences and disadvantages mentioned above, and it is an object of the invention to provide a networking apparatus that can implement, even on an analog telephone connected to a VoIP gateway but furnished with no SIP functions, a caller number display service similar to that offered on an IP telephone.

To achieve the above object, according to the invention, a networking apparatus including a PBX that relays between and manages IP and analog telephones that are assigned extension number information is provided with: a VoIP conversion portion which converts an analog audio signal into an IP signal; an IP connection portion to which an IP telephone is connected; and an analog connection portion to which an analog telephone is connected. Here, when a call originated from an IP or analog telephone is relayed and connected to an analog telephone, extension number information of the call originator is output to the analog telephone.

With this configuration, a networking apparatus has the function of a PBX, and is further provided with a VoIP conversion portion which converts an analog audio signal into an IP signal; an IP connection portion to which an IP telephone is connected; and an analog connection portion to which an analog telephone is connected. And, when a call originated from an IP or analog telephone is relayed and connected to an analog telephone, extension number information of the call originator is output to the analog telephone.

Moreover, according to the invention, the networking apparatus described above is further provided with: an assignment control portion which performs an operation of assigning the analog connection portion the extension number information of the analog telephone; and a storage portion which stores the extension number information of the analog telephone in association with the corresponding analog connection portion. Here, when a call originated from an IP telephone is relayed and connected to an analog telephone, call origination information received from the call-originating IP telephone is converted into extension number information and is then output; on the other hand, when a call originated from an analog telephone is relayed and connected to an analog telephone, extension number information corresponding to the call-originating analog telephone is obtained from the storage portion and is output to the analog telephone.

With this configuration, the networking apparatus is further provided with: an assignment control portion which performs an operation of assigning the analog connection portion the extension number information of the analog telephone; and a storage portion which stores the extension number information of the analog telephone in association with the corresponding analog connection portion. And, when a call originated from an IP telephone is relayed and connected to an analog telephone, call origination information received from the call-originating IP telephone is converted into extension number information and is then output; on the other hand, when a call originated from an analog telephone is relayed and connected to an analog telephone, extension number information corresponding to the call-originating analog telephone is obtained from the storage portion and is output to the analog telephone.

Moreover, according to the invention, a telephony system is provided with: the networking apparatus described above; the analog telephone which is connected to the analog connection portion; and the IP telephone which is connected to the IP connection portion.

BRIEF DESCRIPTION OF THE DRAWINGS

FIG. 4 is a diagram showing an example of settings made in a networking apparatus according to the invention.

DETAILED DESCRIPTION OF PREFERRED EMBODIMENTS

A preferred embodiment of the present invention will be described in detail below with reference to the accompanying drawings. Throughout the specification and the drawings, such components as have substantially the same function/configuration are identified by the same reference signs, and no overlapping description will be repeated.

Figure 1:
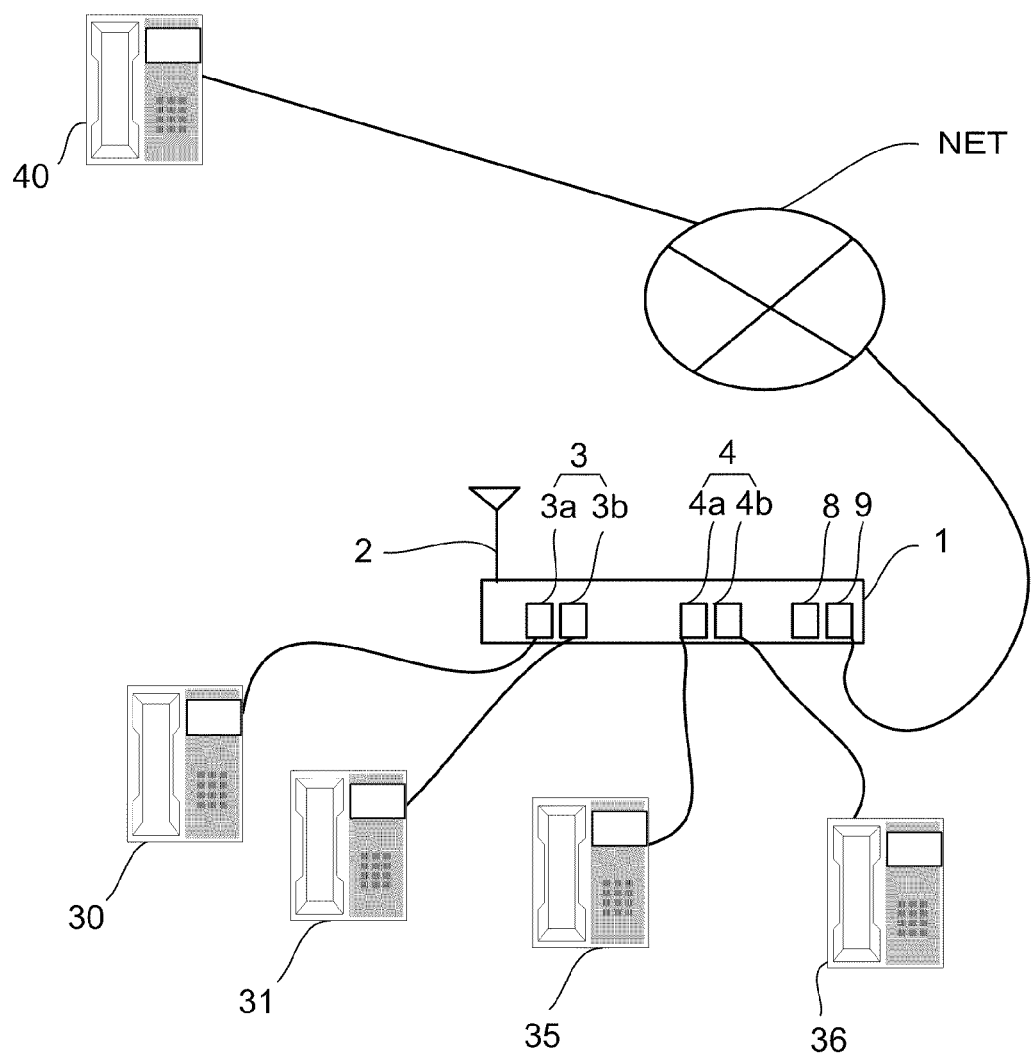
FIG. 1 is a diagram illustrating a network system (telephony system) employing a networking apparatus according to the invention.

First, with reference to FIG. 1, how a networking apparatus embodying the invention is used will be described briefly. FIG. 1 is a diagram illustrating an example of the configuration of a network system (telephony system) employing a networking apparatus embodying the invention.

As shown in FIG. 1, the networking apparatus 1 is connected, via an analog connection portion 3, to analog telephones 30 and 31; is connected, via an IP connection portion 4, to IP telephones 35 and 36; and is connected, via an external connection portion 9, to a public network NET. A telephone 40 is also connected to the public network NET. The analog telephones 30 and 31 and the IP telephones 35 and 36 are assigned extension number information, and the networking apparatus 1, acting as a PBX, relays between and manages those telephones. The number of telephones is not limited to as shown in FIG. 1.

The networking apparatus 1 performs call handling and communication according to SIP (Section Initiation Protocol) so as to establish voice communication paths and enable voice communication between extension IP telephones themselves and between extension telephones and external lines.

SIP will now be described briefly. An IP telephone on the call originator (calling party)'s side sends a request message "INVITE." "INVITE" is a code that initiates a session, and is accompanied by, in the form of SDP (Session Description Protocol), the properties of sessions receivable by the call originator. On receiving "INVITE," the call receiver (called party) sends "180 RINGING" back to the call originator to indicate that the call receiver's telephone is ringing. The reception conditions (codec, port number, etc.) and transmission conditions on the call receiver's side may be presented along with the "180 RINGING" here, though they are usually presented along with "200 OK." Next, the call receiver sends "200 OK" to the call originator to indicate that the call receiver is now ready for voice communication. It is accompanied by, in the form of SDP, the properties of sessions receivable by the call receiver. Along with the "200 OK" here, the reception conditions (codec, port number, etc.) and transmission conditions on the call receiver's side are presented. Next, the call originator sends "ACK" to the call receiver, and in this way the properties usable in communication are negotiated. To terminate communication, the side which wants to terminate sends the code "BYE" to request termination of communication, and in response, the side which receives it sends the code "200 OK" back.

The networking apparatus 1 is provided with an antenna 2; is provided with, as the analog connection portion 3, FXSs (Foreign eXchange Stations) 3a and 3b; and is provided with, as the IP connection portion 4, FXOs (Foreign eXchange Offices) 4a and 4b.

A LAN connection portion 8 is used as a port compatible with a common LAN (Local Area Network) using Ethernet (a registered trademark); specifically, it is used for transfer of information with a device, such as a personal computer, connected to it via a hub (not shown). Transfer of information may be performed by wired communication or by wireless communication using the antenna 2. Moreover, a personal computer or the like may be connected to the LAN connection portion 8 for the purpose of making settings in the networking apparatus 1.

Figure 2:
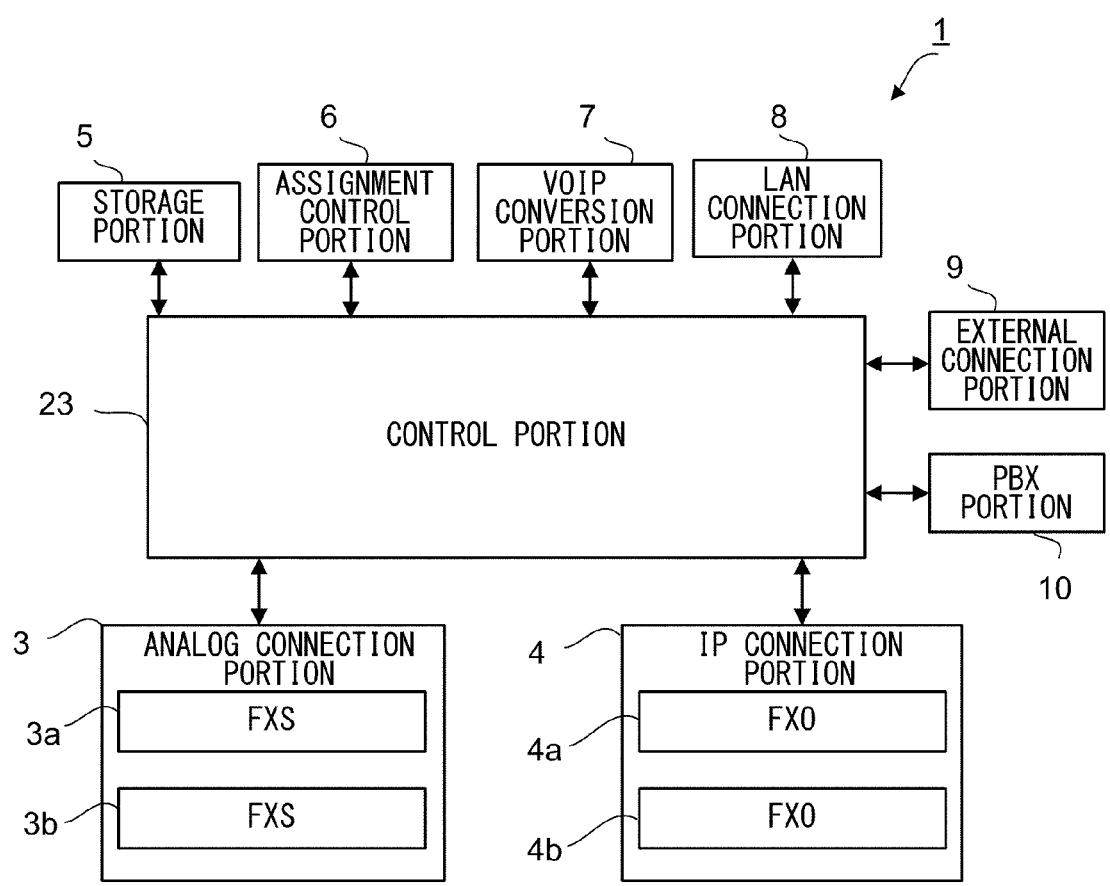
FIG. 2 is a block diagram of a networking apparatus according to the invention.

FIG. 2 is a block diagram showing an example of the configuration of the networking apparatus 1. The networking apparatus 1 includes a control portion 23, the analog connection portion 3, the IP connection portion 4, a storage portion 5, a VoIP conversion portion 7, an assignment control portion 6, the LAN connection portion 8, the external connection portion 9, and a PBX portion 10.

The control portion 23 includes a CPU and memory (neither is shown), and an operation system runs on the CPU.

To the control portion 23, the analog connection portion 3 and the IP connection portion 4 are connected. As the analog connection portion 3, the FXSs (Foreign eXchange Stations) 3a and 3b are provided. To the analog connection portion 3, a plurality of analog telephones are connected. As the IP connection portion 4, the FXOs (Foreign eXchange Offices) 4a and 4b are provided. To the IP connection portion 4, a plurality of IP telephones are connected.

The storage portion 5 is constituted by, for example, a hard disc or a flash memory so as to be rewritable. In the storage portion 5, telephone settings information may be registered in a form associated with the MAC addresses of the IP telephones.

Here, the telephone settings information includes, for example, FK information, special number information, and synchronization information. FK information refers to information specifying what functions are assigned to free function keys (FKs), that is, function buttons.

For example, in a case where each telephone is provided with 15 function buttons numbered 01 to 15 respectively, part or all of the 15 function buttons can be assigned the desired functions.

Special number information refers to numbers for specifying particular voice communication methods set in the networking apparatus 1 as desired; dialing one of those numbers at the head of a telephone number allows one to select a particular voice communication method. Synchronization information refers to information related to synchronization of a ringer. In the storage portion 5, the sum of the numbers of channels of individual telephones, the number of channels of the public network, and the like may be stored.

The contents of the telephone settings information assume the use of telephones, but may be applied to communication applications other than telephones.

In the storage portion 5, extension number information (including terminal IDs, extension numbers, IP addresses (telephones)) is also stored. The extension number information of analog telephones is stored in association with the corresponding analog connection portion 3. The extension number information may be associated with telephone settings information.

Since IP telephones have IP addresses, their extension number information may be stored in association with SIP. For example, the networking apparatus 1 may store N extension numbers of 1 to N respectively which can be assigned to IP telephones.

The assignment control portion 6 controls an operation of assigning extension numbers to analog telephones connected to the analog connection portion 3. The assigning operation is performed through predetermined operation from a personal computer or the like connected to the LAN connection portion 8.

Moreover, the extension number information of the analog telephones 30 and 31 is, in association with the corresponding analog connection portion 3, stored in the storage portion 5. When stored, it may be included in the telephone settings information mentioned above.

The VoIP (Voice over Internet Protocol) conversion portion 7 converts an analog audio signal to an IP audio signal. Specifically, it first compresses an analog audio signal by one of various encoding methods and thereby converts it into packets, which it then converts into an IP audio signal for real-time transfer over a network. As the compression/encoding method for analog audio signals, typically one with a band of 0.3 to 3.4 kHz is used, but one with a band of 0.05 to 7 kHz may be used. In a case where multiple channels are required, a silent compression method may be used which does not send packets so long as the audio is equal to or less than a predetermined level.

It is also possible to send audio packets by use of UDP, which gives priority to real-time processing and performs no resending, and use a buffer memory to absorb irregularities in the intervals and order of packets due to varying delays (latencies) across a packet communication network. Packets aborted on the way are corrected for by insertion of white noise or otherwise. A delay due to buffer correction may cause failure of communication using a modem or DTMF, such as facsimile communication. To avoid that, the packets for digital data may be those complying with T.38.

The LAN connection portion 8 is used as a port compatible with a common LAN using Ethernet (a registered trademark).

The external connection portion 9 is a portion connected to a public network NET. The public network may be a VoIP network.

The PBX portion 10 functions as a line switcher for telephones to provide the function of extension telephones. In particular, according to the invention, the PBX portion 10 has the function of relaying for analog telephones and for the extension numbers of IP telephones. The PBX portion 10 also has the function of line switching between a WAN, that is, a wide-area network, and a LAN, that is, a local-area network.

The PBX portion 10 may be of any type, for example, a digital switcher which achieves relaying and switching by processing control signals and voice communication signals with digital signals, or an electronic switcher which uses an electronic circuit such as a microprocessor as a control circuit. Moreover, when the PBX portion 10 sends a notification of receipt of a call to a telephone that is subscribed to the direct dial-in service, it sends it a signal including the caller number display service (calling number information, that is, pre-voice communication information delivery service) and the caller number. That is, the PBX portion 10 has the function of, on receiving a call, sending a telephone a number display signal to complying with ITU V. 32.

For example, in a case where the call receiver's telephone is connected to an analog telephone network, the PBX portion 10 reverses the polarity with respect to that telephone and sends it an information reception terminal start signal (CAR). On detecting the CAR signal, the telephone connected to the telephone network closes the DC (direct-current) loop and thereby returns a temporary response signal. On detecting the temporary response signal, the PBX portion 10 sends an information signal containing the dial-in number and the caller number in the form of a modem signal. On receiving the information signal, the telephone opens the DC loop and thereby returns a reception completion signal.

On receiving the reception completion signal, the PBX portion 10 sends a ringing signal, and simultaneously sends the call originator an RBT (Ringing Back Tone, a tone indicating that the called telephone is ringing). As a result, the telephone enters a call-receiving state, that is, it rings. Through the sequence of operations described above, the telephone can obtain the dial-in number and the caller number from the modem signal sent from the PBX portion 10.

Moreover, the PBX portion 10 also has the function of a SIP server for the purpose of accepting a call origination request from a telephone. SIP is short for Session Initiation Protocol, which is a protocol used in IP-izing of audio communication such as VoIP. Having the function of a SIP server, the PBX portion 10 can initiate, modify, and terminate sessions of IP telephony etc. by use of SIP.

As described above, since the networking apparatus 1 is provided with the VoIP conversion portion 7 and the PBX portion 10, it can relay voice communication using not only IP telephones but also analog telephones. That is, it can relay between the analog telephone 30 and the analog telephone 31, between analog telephone 30 and the IP telephone 35, between the IP telephone 35 and the IP telephone 36, and between the IP telephone 35 and the analog telephone 30.

The PBX portion 10 may have group-calling and all-calling functions to permit a particular telephone to call a group of, or all, telephones. The PBX portion 10 is furnished with the ordinary functions of a telephone for voice communication, such as call origination, call reception, call suspension, etc.

Figure 3:
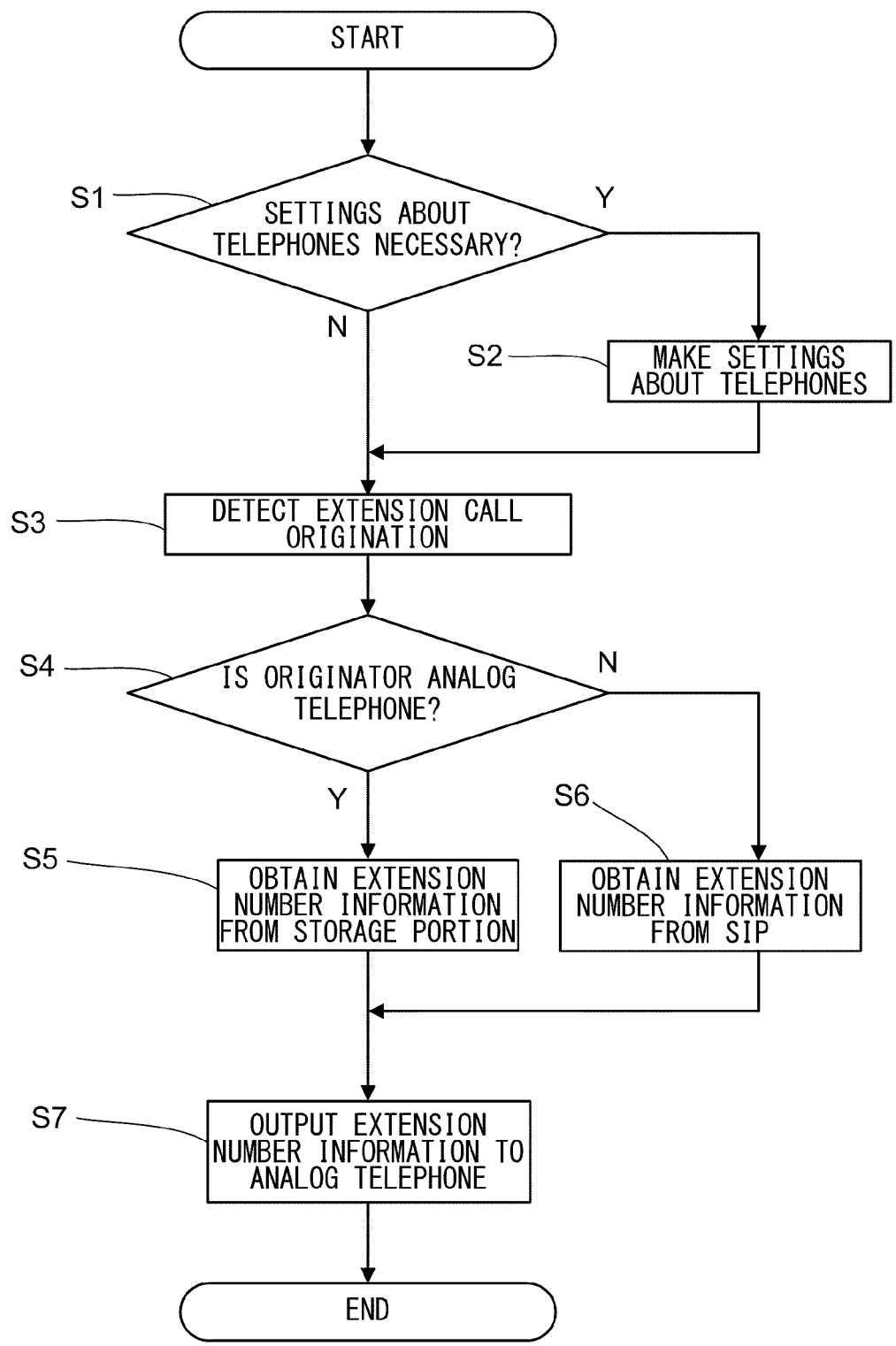
FIG. 3 is a flow chart of an operation for displaying extension number information in a networking apparatus according to the invention.

Now, with reference to FIG. 3, a description will be given of how the networking apparatus 1, configured as described above, makes settings about telephones, relays between and manages them, and controls the caller number display service (pre-voice communication information delivery service).

At step S1, whether or not the networking apparatus 1 needs to make settings about telephones is checked. If it does, the flow proceeds to step S2; otherwise, the flow proceeds to step S3.

At step S2, the networking apparatus 1 makes settings about telephones. An example of settings is shown in FIG. 4. The settings are made on a settings screen 50, from a personal computer (now shown) connected via a LAN cable or the like to the LAN connection portion 8. As shown on the settings screen 50, the networking apparatus 1 makes, as settings about telephones, settings about each of analog and IP telephones.

As shown in FIG. 4, settings may be made differently for different ports 51 for telephones. For example, settings are made about extension numbers 52, groups 53, and time-out operations 54. Extension numbers 52 are the extension numbers of the telephones connected to the ports 51. Groups 53 are used for group calling and the like, and are the groups into which the telephones are grouped. Time-out operations 54 are the operations to be performed when the called extension telephones are not answering because they are engaging in voice communication or no one is available around them. These operations are, for example, chosen between transfer to another telephone or reception of voice mail.

Though not shown, there may be provided a screen for making settings about call origination. For example, group calling or all calling may be chosen according to the calling number or the like.

At step S3, call origination from a particular telephone to another particular telephone, both among those which the networking apparatus 1 relays between and manages, is detected as intra-extension voice communication. Specifically, the networking apparatus 1 detects a signal that relays an intra-extension connection request received from a telephone it manages, according to the connection destination number of the connection request, to an extension analog or IP telephone.

At step S4, whether or not the call originator is an analog telephone is checked. If it is an analog telephone, the flow proceeds to step S5; if it is not an analog telephone but an IP telephone, the flow proceeds to step S6.

At step S5, extension number information of the call originator-side analog telephone is obtained from the storage portion 5. In the storage portion 5, the extension number information of analog telephones is stored in association with the corresponding analog connection portion 3.

At step S6, the call origination information received from the call-originating IP telephone is converted to extension number information by SIP.

At step S7, the extension number information is output to the analog telephone. In this way, the analog telephone displays, on the display portion provided there, the extension number information.

Thus, the flow ends.

As described above, a networking apparatus including a PBX that relays between and manages IP and analog telephones that are assigned extension number information is provided with: a VoIP conversion portion 7 which converts an analog audio signal into an IP signal; an IP connection portion 4 to which an IP telephone is connected; and an analog connection portion 3 to which an analog telephone is connected; moreover, when a call originated from an IP or analog telephone is relayed and connected to an analog telephone, extension number information of the call originator is output to the analog telephone. Thus, not only IP telephones but also analog telephones are assigned extension number information like that of IP telephones. Accordingly, it is possible to provide a useful networking apparatus. Moreover, there is no need to provide VoIP or PBX equipment newly, and thus it is possible to achieve cost reduction and size reduction simultaneously.

Moreover, according to the invention, the networking apparatus is further provided with: an assignment control portion which performs an operation of assigning the analog connection portion the extension number information of the analog telephone; and a storage portion which stores the extension number information of the analog telephone in association with the corresponding analog connection portion; moreover, when a call originated from an IP telephone is relayed and connected to an analog telephone, call origination information received from the call-originating IP telephone is converted into extension number information and is then output, and when a call originated from an analog telephone is relayed and connected to an analog telephone, extension number information corresponding to the call-originating analog telephone is obtained from the storage portion and is output to the analog telephone. Thus, not only IP telephones but also analog telephones are assigned extension number information like that of IP telephones. Accordingly, it is possible to provide a useful networking apparatus. Moreover, there is no need to provide VoIP or PBX equipment newly, and thus it is possible to achieve cost reduction and size reduction simultaneously.

The present invention is not limited by the embodiment described above. The specifics of different parts of a networking apparatus according to the invention allow for various design changes. For example, although the above description deals with extension telephones, this is not meant to limit the invention; the invention is applicable to the relaying of an external telephone 40.

Moreover, extension number information may be adapted to, other than the extension number of the call originator, various kinds of data such as character-based information, voice mail, video, and sound. The extension number of the call originator may be displayed by use of group calling or all calling.

For the settings to be made in the networking apparatus 1, each IP telephone may transmit its terminal ID to the networking apparatus 1; this permits the networking apparatus 1 to make settings about telephones, in the order in which it receives their terminal IDs, by assigning them extension number information starting with 1. In this way, it is possible to reduce the trouble of assigning extension number information when assigning IP telephones their extension number information.

What is claimed is:

1. A networking apparatus including a PBX that relays between and manages IP and analog telephones that are assigned extension number information, the apparatus comprising:
    a VoIP conversion portion which converts an analog audio signal into an IP signal;
    an IP connection portion to which an IP telephone is connected;
    an analog connection portion to which an analog telephone is connected,
    an assignment control portion which performs an operation of assigning the analog connection portion the extension number information of the analog telephone; and
    a storage portion which stores the extension number information of the analog telephone in association with the corresponding analog connection portion,
    wherein,
    when a call originated from an IP telephone is relayed and connected to an analog telephone, call origination information received from the call-originating IP telephone is converted into extension number information and is then output, and
    when a call originated from an analog telephone is relayed and connected to a destination analog telephone, extension number information corresponding to the call-originating analog telephone is obtained from the storage portion and is output to the destination analog telephone.

2. A telephony system comprising:
    the networking apparatus according to claim 1;
    the analog telephone which is connected to the analog connection portion; and
    the IP telephone which is connected to the IP connection portion.

* * * * *